United States Patent
Rodriquez

[19]

[11] Patent Number: 5,771,530
[45] Date of Patent: Jun. 30, 1998

[54] METAL DETECTION AND RETRIEVAL SYSTEM

[76] Inventor: Reinaldo Rodriquez, 12500 Hyanis Ct., Orlando, Fla. 32828

[21] Appl. No.: 867,952

[22] Filed: Jun. 3, 1997

[51] Int. Cl.$^6$ .................................................. A47L 7/00
[52] U.S. Cl. ................................... 15/339; 324/326
[58] Field of Search ........................... 15/339, 347, 352; 324/326

[56] References Cited

U.S. PATENT DOCUMENTS

| | | | |
|---|---|---|---|
| 2,353,621 | 7/1944 | Replogle | 15/339 X |
| 2,373,915 | 4/1945 | Replogle | 15/339 X |
| 3,965,608 | 6/1976 | Schuman | 43/110 |
| 4,185,355 | 1/1980 | Williams | 15/344 |
| 4,499,713 | 2/1985 | Stone | 15/345 X |
| 4,889,391 | 12/1989 | Cornelius | 15/339 X |
| 5,018,238 | 5/1991 | Nelle | 15/314 |
| 5,245,726 | 9/1993 | Rote et al. | 15/339 |
| 5,440,781 | 8/1995 | Kitazawa et al. | 15/344 |

*Primary Examiner*—Chris K. Moore
*Attorney, Agent, or Firm*—William M. Hobby, III

[57] ABSTRACT

An empty shell casing retrieval system has a metal detector and retrieval system. The metal detector has a metal detector having a metal detecting coil and a readout gauge and an on/off switch. A hollow tube has a metal detecting coil attached to one end portion thereof and the readout gauge and on/off switch attached to the other end of the hollow tube. A collection container is attached to the hollow tube for collecting metal pieces being drawn through the hollow tube and a vacuum cleaner or other vacuum source is attached to the hollow tube for placing a negative pressure in the tube to draw pieces of detected metal into the hollow tube and collection container. The tube has a plenum in one end having a separation screen therein for preventing metal pieces from entering the vacuum source. The metal detector readout gauge and switch are mounted remotely on the plenum and the handle has a vacuum on/off switch attached thereto.

18 Claims, 2 Drawing Sheets

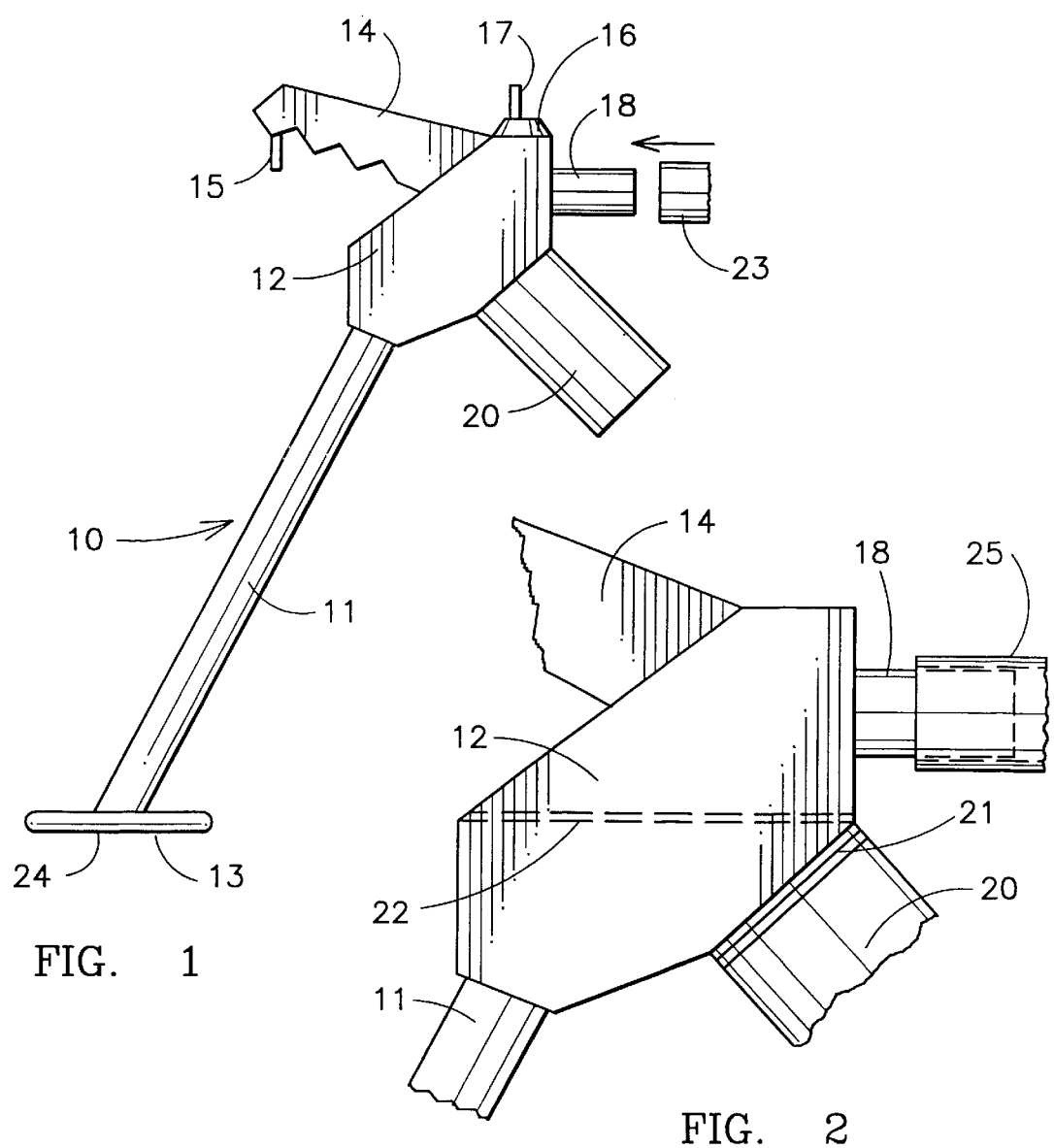
FIG. 1
FIG. 2
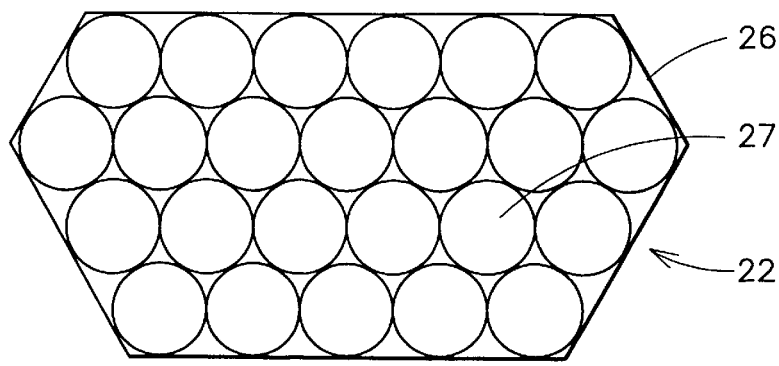
FIG. 3

METAL DETECTION AND RETRIEVAL SYSTEM

BACKGROUND OF THE INVENTION

The present invention relates to a metal detector and retrieval system and especially to an empty shell casing retrieval system.

Most rifles, handguns and the like today utilize bullets having a gun shell or metal casing having a bullet attached thereto. The gun shell has a firing cap mounted at one end and a powder charge in the casing. When the bullet is fired from a rifle or gun, the empty shell casing is ejected from the gun. In the case of automatic or semi-automatic type weapon, the empty casings are rapidly ejected from the gun during target practice. The empty metal casing that have been ejected then need to be collected for recycling of the metal casings or for reloading the casings. This has become a problem at many gun ranges where the firing of weapons is done at an outdoor location and where casings are difficult to locate and retrieve. In addition, the constant retrieval requires not only the location of the metal shell casings but requires the person retrieving the casings to bend over or get down on his knees to locate and retrieve casings which then must be picked up by hand and delivered to a recycle point.

The present invention is directed towards a system for locating empty shell casings especially at firing ranges and practice areas and retrieving the empty casings for recycling and utilizes a metal detector for locating the metal casings and a vacuum retrieval system for retrieving the casings.

Various types of vacuum retrieval systems have been utilized in the past for retrieving small objects. In the U.S. Pat. No. 3,965,608 to Schuman, a manually operated suction device is used for capturing small objects in which a manually operated piston generates a suction pulse to draw small objects thereinto. In the Williams U.S. Pat. No. 4,185,355, an apparatus for cleaning up animal feces deposits is provided in which a vacuum cleaner sucks the animal feces into a collection bag. In the Nelle patent, U.S. Pat. No. 5,018,238, a hand-held wand has an on/off switch for remotely connecting to a fan so that upon gasping the wand, the index finger is automatically positioned over an on/off switch. The switch operates the fan to collect eraser debris from a drawing surface. The Rote et al. patent, U.S. Pat. No. 5,245,726, is an apparatus for picking up and shredding natural yard waste and includes a housing having an impeller for sucking leaves and debris into a collection tube, shredding the debris, and feeding the debris into a collection bag. The Kitazawqa et al. patent, U.S. Pat. No. 5,440,781, is a hand-held cleaner which sucks fallen leaves into a tube and directs them into a collection bag.

The present invention is directed towards an empty casing or gun shell retrieval system but can be utilized for the location and retrieval of any small metal object and has a metal detector coil located adjacent the end of a vacuum retrieval tube with the gauges and switches for the metal detector located remotely on a separation plenum. The retrieval system has a handle with a switch for actuating the vacuum so that the system can be manually carried for locating and retrieving empty shell casings at a firing range or other location.

SUMMARY OF THE INVENTION

A metal detector and retrieval system has a metal detector having a metal detecting coil and a readout gauge and an on/off switch. A hollow tube has a metal detecting coil attached to one end portion thereof and a metal detection readout gauge and on/off switch attached to the other end portion of the hollow tube. A collection container is attached to the hollow tube for collecting metal pieces being drawn through the hollow tube and a vacuum cleaner or other vacuum source is attached to the hollow tube for placing a negative pressure in the tube to draw pieces of detected metal into the hollow tube and collection container. The tube has a plenum in one end having a separation screen therein for preventing metal pieces from entering the vacuum source. The metal detector readout gauge and switch are mounted remotely to the plenum and the handle has a vacuum on/off switch attached thereto.

BRIEF DESCRIPTION OF THE DRAWINGS

Other objects, features, and advantages of the present invention will be apparent from the written description and the drawings in which:

FIG. 1 is a side elevation of an empty shell casing retrieval system in accordance with the present invention;

FIG. 2 is a sectional view of the plenum section of the shell casing retrieval system of FIG. 1;

FIG. 3 is an elevation of a separation screen for use in the retrieval system of FIGS. 1 and 2;

DESCRIPTION OF THE PREFERRED EMBODIMENT

Figure 4:
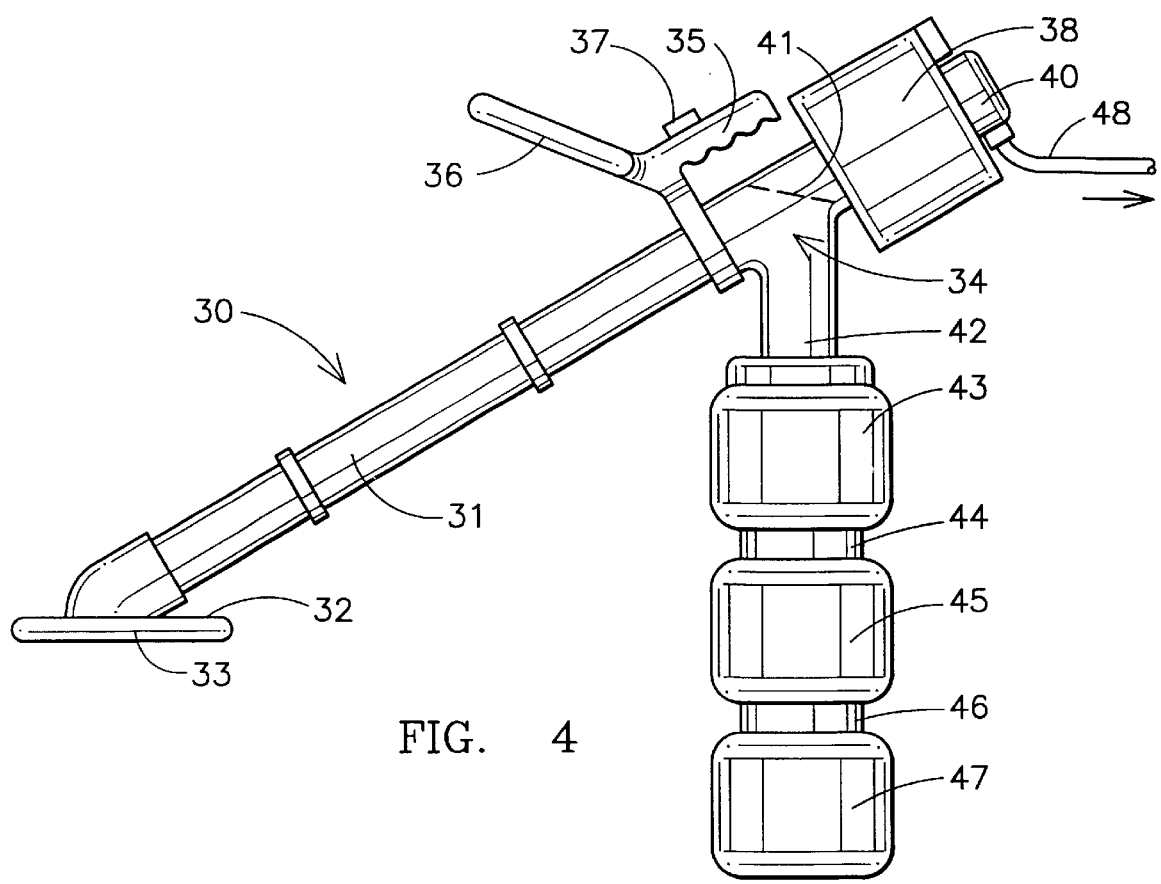
FIG. 4 is a side elevation of another embodiment of my shell casing retrieval system.

Referring to FIGS. 1–3 of the drawings, an empty shell casing location and retrieval apparatus 10 includes a hollow metal tube 11 having a plenum 12 attached to one end thereof and a metal detector coil 13 attached to the other end of the tube 11 and wrapped around the end of the tube. The plenum 12 has a handle 14 attached thereto which has a vacuum on/off attached thereto. The plenum 14 also has the metal detector readout gauge 16 attached thereto as well as a metal detector on/off switch 17. The plenum has a vacuum connector 18 and a recovery container 20 attached thereto. As seen in FIG. 2, a recovery container is threadedly attached with the threads 21 to the plenum 12 and a separation screen or grate 22 is mounted in the plenum 12. A vacuum hose 23 is illustrated in FIG. 1 shaped to attach to the vacuum connector inlet 18. The hose 23 is attached to the connector 18 and to a remote vacuum cleaner or suction system for generating a negative pressure within the plenum 12 and within the tube 11 to recover shell casings or other pieces of material at the end 24 of the tube 11. In FIG. 2, a vacuum cleaner 25 is attached directly to the connector 18. A separation screen or grate 22 may be more clearly seen in FIG. 3 in which a metal or polymer grate 26 has a plurality of circular openings 27 therein sized and shaped to block a shell housing or other small pieces of metal from passing therethrough.

In operation, an operator will manually hold the metal detector and retrieval apparatus 10 with one hand, grasping the handle 14 and actuate the switch 17 to turn on the metal detector and activate the metal detection coils 13. The operator then moves the pickup head 24 on the end of the tube 11 over the earth or floor until the metal detector coils 13 detects a piece of metal with the readout at the gauge 16 or which could, of course, be an audible readout. The vacuum source from the tube 23 or the vacuum cleaner 25 then is activated with the switch 15 in a one hand operation. This produces a negative pressure in the plenum 12 and in the tube 11 to lift a small object located at the pickup end 24 of the inlet tube 11. The object is then pulled through the tube 11 and into the plenum where it is pulled against the separation screen 22 and will bounce back at an angle into the recovery container 20 while air being sucked through the tube 11 through the separation screen 22. The air entering the vacuum connector 18 into either the vacuum cleaner or a vacuum cleaner tube which has a filtration system built thereinto for collecting any small amounts of debris or other materials that can pass through the screen 22. Thus, only objects of sufficient size and weight are directed into the recovery container 20. The recovery container 20 can then be removed from the apparatus 10 and the empty shell casings deposited for recycling.

Figure 5:
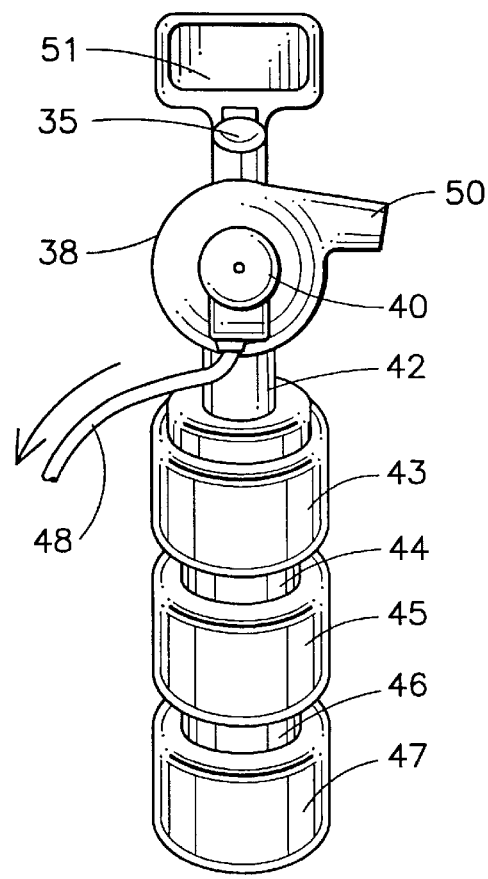
FIG. 5 is a rear elevation of the embodiment of FIG. 4.

Referring to FIGS. 4 and 5, a second embodiment of an empty shell casing location and retrieval apparatus 30 has a hollow tube 31 having a metal detector coil 32 attached to one end with an opening passing through the bottom 33 of the coil 32 to form a continuous passageway through the tube 31 into a collection plenum 34. The plenum 34 has a handle 35 having the metal detector electronics and readout 36 mounted thereto. A switch 37 is positioned on the handle for turning the metal detector and the blower 38 on and off. The blower 38 is a squirrel cage type blower having an electric motor 40 and is attached to the plenum 34. A screen 41 blocks the shell casings from entering the squirrel cage blower 38 and deflects the empty shells down the collection pipe 42 where the shells are captured in sorting containers each separated by a screened mesh for sorting by size. The first collection container 43 is for shotgun shells and is separated by a mesh divider 44 which may be a ½" mesh sufficient to block shotgun shell casings but to allow brass casings to pass therethrough which are then collected in the collection container 45. Collection container 45 has a bottom formed of a mesh 46, such as a ¼" mesh, which will capture empty brass shell casings but will allow waste grass and trash to pass therethrough for collection in the container 47. An electrical conductor 48 can lead to a separately mounted battery pack which can be mounted on a person's clothing, such as a belt or on the hip. The line 48 can also connect to an AC power adaptor for driving the electric motor 40 to operate the squirrel cage blower 38. An exhaust 50 directs the exhaust air and fine trash from the blower 38 into the atmosphere. FIG. 5 also illustrates the metal detector screen 51 positioned so when holding the shell casing retriever 30, the metal detector screen 51 is clearly visible and can be actuated along with the blower through the on/off switch 37.

It should be clear at this time that an empty shell casing retrieval system has been provided which can easily retrieve empty shell casings at firing ranges or at any other location. However, it will also be clear that the metal detector and retrieval system can easily be utilized for locating and retrieving any small metal pieces which can be collected for recycling without departing from the spirit and scope of the invention. Accordingly, the present invention is not to be construed as limited to the forms shown which are to be considered illustrative rather than restrictive.

I claim:

1. A shell casing retrieval system comprising:
    a plenum;
    a shell casing pickup tube having two end portions and having a shell casing pickup head on one end portion thereof and being attached to said plenum at the other end portion thereof;
    a metal detector attached to said pickup tube adjacent the shell casing pickup head;
    a shell casing recovery container attached to said plenum for collected shell casings being drawn through said pickup tube; and
    a vacuum connection attached to said plenum for connection to a vacuum source for placing a negative pressure in said plenum and pickup tube to draw shell casings detected by said metal detector into said plenum and into said shell casing recovery container responsive to a negative pressure being placed on said shell casing pickup tube.

2. A shell casing retrieval system in accordance with claim 1 including a shell casing separator positioned inside said plenum and attached thereto.

3. A shell casing retrieval system in accordance with claim 2 in which said shell casing separator is grating mounted in said plenum having grate opening sized to prevent shell casings from passing therethrough.

4. A shell casing retrieval system in accordance with claim 3 in which said grating is formed with a plurality of generally round openings therein.

5. A shell casing retrieval system in accordance with claim 2 in which said recovery container is removably attached to plenum.

6. A shell casing retrieval system in accordance with claim 2 in which said vacuum source is a vacuum cleaner having a flexible hose attached thereto and to said vacuum connection.

7. A shell casing retrieval system in accordance with claim 2 in which said vacuum source is a vacuum cleaner attached to said vacuum connection.

8. A shell casing retrieval system in accordance with claim 2 in which said plenum has a handle attached thereto and extending therefrom.

9. A shell casing retrieval system in accordance with claim 8 in which said metal detector is operatively connected to a readout gauge mounted on said plenum.

10. A shell casing retrieval system in accordance with claim 8 in which said handle has vacuum switch mounted thereon for activating the vacuum source responsive to operating said vacuum switch.

11. A shell casing retrieval system in accordance with claim 2 in which said metal detector has switch attached to plenum for activating said metal detector.

12. A retrieval system for small metal parts comprising:
    a plenum;
    a metal piece pickup tube having two end portions and having a metal piece pickup head on one end portion thereof and being attached to said plenum at the other end portion thereof;
    a metal detector attached to said pickup tube adjacent the metal piece pickup head;
    a metal piece recovery container attached to said plenum for collected metal pieces being drawn through said pickup tube; and
    a vacuum connection attached to said plenum for connection to a vacuum source for placing a negative pressure in said plenum and pickup tube to draw metal pieces detected by said metal detector into said plenum and into said metal piece recovery container responsive to a negative pressure being placed on said metal piece pickup tube.

13. A metal piece detector and retrieval system comprising:
    a metal detector having a metal detecting coil and a readout gauge and an on/off switch and an electrical power source;

a hollow tube having two end portions and having said metal detecting coil attached to one end portion thereof and said readout gauge and on/off switch attached to the other end portion of said hollow tube;

a collection container attached to said hollow tube for collecting metal pieces being drawn through said hollow tube; and a vacuum connection attached to said hollow tube for connection to a vacuum source for placing a negative pressure in said vacuum tube to draw pieces detected by said metal detector into said hollow tube and collection container whereby metal pieces can be detected and recovered.

14. A shell casing retrieval system in accordance with claim 13 in which said hollow tube has a handle coupled thereto and extending therefrom.

15. A shell casing retrieval system in accordance with claim 14 in which said hollow tube includes a plenum on the other end portion thereof.

16. A shell casing retrieval system in accordance with claim 14 in which said handle has a vacuum actuating switch mounted thereon for actuating said vacuum source upon said metal detector sensing a piece of metal.

17. A shell casing retrieval system in accordance with claim 13 in which said hollow tube has a vacuum cleaner attached to said vacuum connection.

18. A shell casing retrieval system in accordance with claim 13 in which said hollow tube has a separation screen mounted therein to block collected pieces from entering said vacuum connection.

* * * * *